United States Patent [19]

Ford et al.

[11] Patent Number: 4,889,683

[45] Date of Patent: Dec. 26, 1989

[54] THERMALLY RESPONSIVE TRIGGER DEVICES AND THEIR USE IN SHUT-DOWN DEVICES FOR NUCLEAR REACTORS

[75] Inventors: James Ford, Liverpool; John Webb, Lancashire, both of England

[73] Assignee: United Kingdom Atomic Energy Authority, London, England

[21] Appl. No.: 842,854

[22] Filed: Mar. 24, 1986

Related U.S. Application Data

[63] Continuation of Ser. No. 459,999, Jan. 21, 1983, abandoned.

[30] Foreign Application Priority Data

Jan. 28, 1982 [GB] United Kingdom ................ 8202435
Jan. 28, 1982 [GB] United Kingdom ................ 8202436

[51] Int. Cl.$^4$ .............................................. G21C 7/02
[52] U.S. Cl. ...................................... 376/336; 376/233
[58] Field of Search .............. 376/219, 233, 240, 336, 376/337; 74/99 R, 99 A, 104, 107

[56] References Cited

U.S. PATENT DOCUMENTS

| 2,430,940 | 11/1947 | Leland | 74/99 A |
| 3,976,540 | 8/1976 | Sowa | 376/336 |
| 3,992,257 | 11/1976 | Erp et al. | 376/336 |
| 4,139,414 | 2/1979 | Giuggio et al. | 376/337 |
| 4,204,909 | 5/1980 | Giuggio et al. | 376/336 |
| 4,440,366 | 4/1984 | Keeler et al. | 74/99 A |

FOREIGN PATENT DOCUMENTS 1559770 1/1980 United Kingdom .
1580322 12/1980 United Kingdom .

*Primary Examiner*—Deborah L. Kyle
*Assistant Examiner*—Richard W. Wendtland
*Attorney, Agent, or Firm*—William R. Hinds

[57] ABSTRACT

A thermally responsive trigger device comprises a closed bellows (14) having a filling a liquid metal and acting on a trigger (19) responsive to the free end of the bellows. The bellows and trigger are located at a temperature measuring location which is the coolant flow outlet (15) from a demountable sub-assembly vehicle (10) having a fuel unit (11) and a triggerable absorber unit (12). The outlet flowing coolant sweeps over the bellows (14) and once the expansion of the bellows exceeds a threshold a pin (26) and cam (28) at the free end of the bellows causes a plate (21) to move to a release the absorber unit (12).

4 Claims, 3 Drawing Sheets

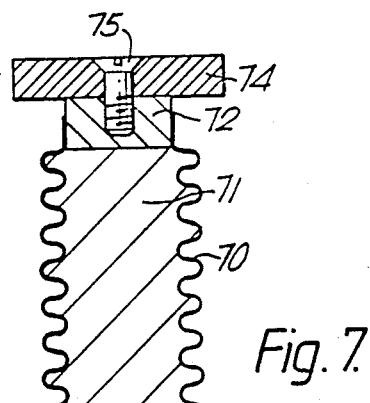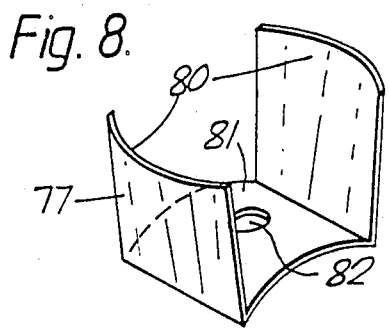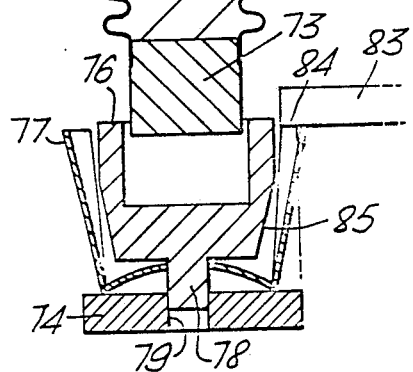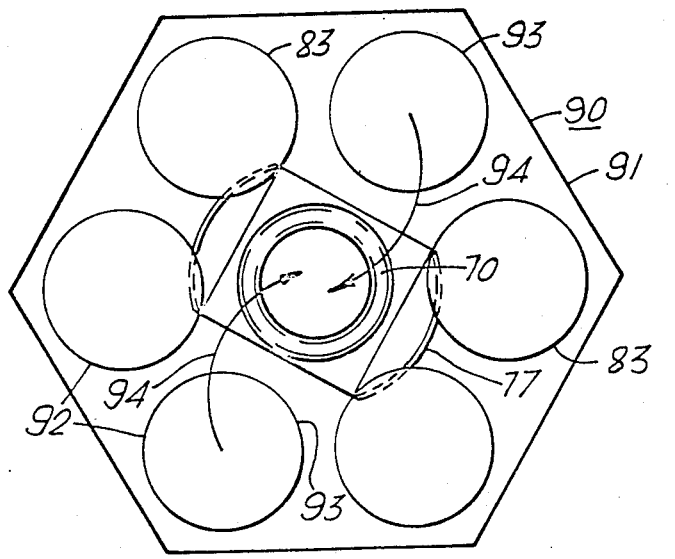

THERMALLY RESPONSIVE TRIGGER DEVICES AND THEIR USE IN SHUT-DOWN DEVICES FOR NUCLEAR REACTORS

BACKGROUND OF THE INVENTION

This invention relates to thermally responsive trigger devices suitable for use in liquid metal (conveniently identified as sodium) cooled systems such as sodium-cooled fast reactors where a trigger may typically be required at temperatures up to 700° C. to release neutron absorber units.

"Hot" magnetic triggers are known. Such devices rely upon the fact that all magnetic materials have a Curie point which is a temperature at which the material becomes de-gaussed and ceases to function magnetically. The attainment of the Curie point can, for example, allow the release of a component which had previously been magnetically held or retained. For such triggers to be acceptable a suitable magnetic material has to be selected to give the trigger function at the correct temperature and at the same time the selected material must be acceptable in the context of its use, and not deteriorate or introduce risks. Such devices are not adjustable and they also operate under stress.

Fusible links are also known but these can give rise to problems similar to those referred to above in relation to magnetic triggers.

Bellows compression devices are also known (see for example GB-PS 1,580,322) in which an expansible material such as sodium-potassium alloy contained in a helical tube, is connected with a reservoir column outside a bellows to compress the bellows with temperature rise and the bellows then operates a trigger via linkages. Such devices include a significant number of co-related parts and hence there must be a modest probability of failure of the parts themselves or at the interconnection between the parts. Repair or replacement of failed parts in a nuclear reactor can be very difficult and costly.

FEATURES AND ASPECTS OF THE INVENTION

The present invention continues with the bellow concept but improves it in that it is arranged for the bellows to be closed (that is it does not have any openings into connecting tubes or bulbs), the bellows has a filling of liquid metal, and the bellows is disposed to act as a trigger device in the vicinity of its free end. The bellows and trigger are then located at the actual location at which temperature is to be sensed.

With this improvement presented it is possible to incorporate it into a nuclear fast reactor in a very advantageous way.

In known fast reactor shut-down arrangements a neutron absorber rod is suspended above the reactor core and is arranged to be released to fall into a receiving channel in the core on receipt of an emergency signal. However, both the core support structure and the absorbing carrying structure can distort and substantial tolerances have to be provided to ensure that the absorber rod will enter its receiving channel and pass into that channel despite distortion.

In this context the present invention takes the already known sub-assembly form of construction of fast reactor cores and the already known devices called "demountable sub-assembly vehicles" used in such cores for conducting irradiation experiments. These vehicles are self-contained and designed for easy removal and insertion into the core. The fact that they are self-contained allows the avoidance or reduction of problems of distortions in and deflections between components of a large integrated structure. The fact that they are easily removable and replaceable allows a high standard of testing and performance to be maintained The trigger device of the present invention accordingly finds use in a demountable sub-assembly vehicle having therein a fuel unit, a triggerable absorber unit and coolant inlet and outlet arranged so that coolant in flow between inlet and outlet passes first over the fuel unit and then over a temperature responsive trigger in the absorber unit, which trigger includes said device to trigger the absorber unit to fall when a threshold temperature is reached.

DESCRIPTION OF THE DRAWINGS

The invention will now be described with reference to an accompanying drawing, in which:

FIG. 7 shows another trigger device according to the invention in sectional elevation;

FIG. 8 shows an element of the device of FIG. 7 in a perspective view;

FIG. 9 shows another element of the device of FIG. 7 in perspective view; and

FIG. 10 shows in diagrammatic plan view the device of FIG. 7 used to control the release of control elements in a fast reactor.

DESCRIPTION OF THE PREFERRED EMBODIMENTS

Figure 1:
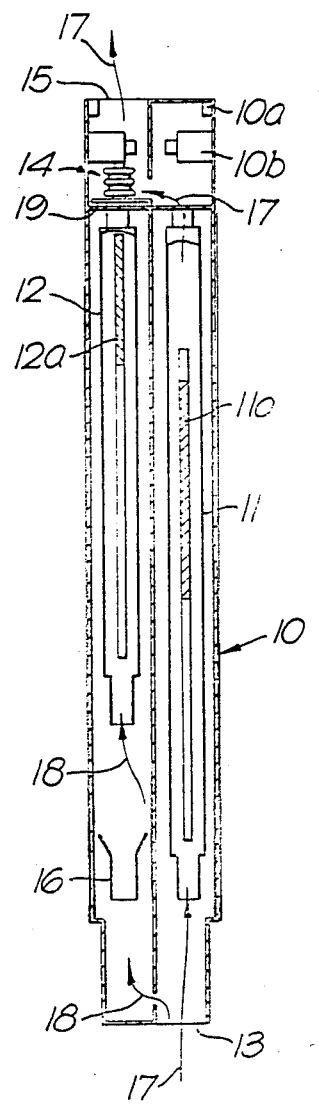
FIG. 1 shows diagrammatically in elevation a subassembly vehicle incorporating a trigger device according to the invention.

In FIG. 1, a removable sub-assembly vehicle 10 having lifting lugs 10a and orientation devices 10b, has two fuel units 11 (only one being shown but see also FIGS. 5 and 6) and two triggerable absorber units 12 (only one being shown). Coolant enters the vehicle at inlet 13, sweeps over the fuel units 11 and diverts over sodium filled bellows 14 (which are associated with the units 12) and discharges at an outlet 15. The units 12 are suspended above dash pots 16. The fissile region of the fuel units 11 is represented by a hatched portion 11a and the absorber region of the absorber units 12 is represented by a hatched portion 12a which is above the region represented by 11a. Coolant flow is indicated by arrows 17. A by-pass coolant flow is represented by arrows 18. This is substantially smaller than the flow represented by arrows 17 and serves to avoid stagnation around the absorber units 12 and also serves to cool the absorber units 12.

A triggering mechanism, described in more detail with reference to FIG. 2 below, is identified by the numeral 19.

Figure 2:
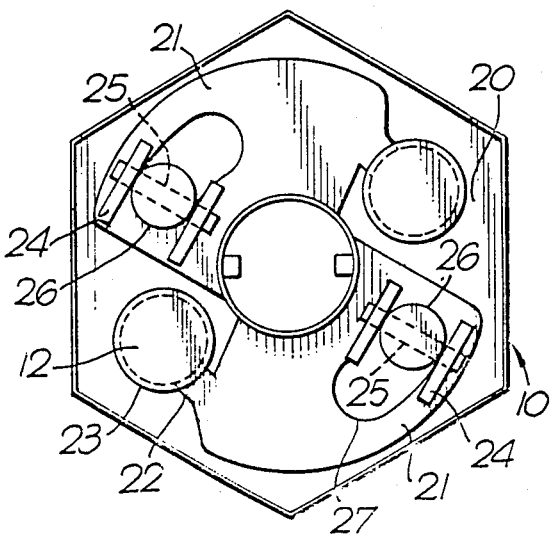
FIG. 2 shows diagrammatically in plan the trigger device in the vehicle of FIG. 1.

In FIG. 2 there is shown the vehicle 10 which supports a fixed hexagonal shaped plate 20. The plate 20 supports, in its turn, a pair of separately movable rotary wing-shaped plates 21. The plates 21 each have a projection or lip 22 which latches below a rim 23 of absorber units 12. The plates 21 have upstands 24 secured to them and these define cam slots (as mentioned below with FIG. 3). A cam rod 25 is shown between each pair of upstands 24 and this engages with a push rod 26 penetrating apertures 27 in the plate 21.

Figure 3:
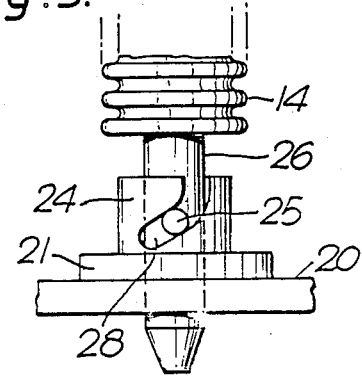
FIG. 3 shows in elevation, a cam arrangement which is a part of the trigger device of FIG. 2.

For FIG. 3 there is shown the bellows 14, which has its free end attached to the push rod 26, and the cam rod 25 engaging a cam slot 28 in the plate 24 which is, in turn, secured to a wing-shaped plate 21. The push rod 26 is shown passing through the plate 20.

Figure 4:
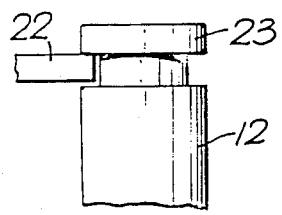
FIG. 4 shows in elevation the support of an absorber unit.

In FIG. 4 a projection 22 on one of the wing-shaped plates 21 is shown latched below the rim 23 of an absorber unit 12.

Figure 5:
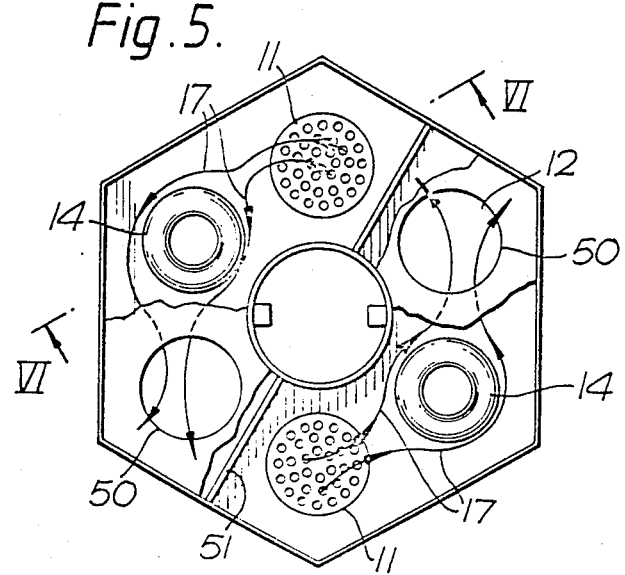
FIG. 5 shows diagrammatically in plan the relative disposition of fuel units, absorber units and coolant units.

In FIG. 5 the sub-assembly vehicle is shown in plan. This comprises two fuel units 11, two bellows 14 associated with triggerable absorber units and two coolant outlet apertures 50. A partition 51 is also provided. Coolant rises vertically in fuel units 11 and, on discharge at the top of the units, the coolant seeks the outlets 50 by sweeping over the bellows 14 of the absorber units. The coolant flow is indicated by arrows 17. The absorber units 12 lie below the outlets 50.

Figure 6:
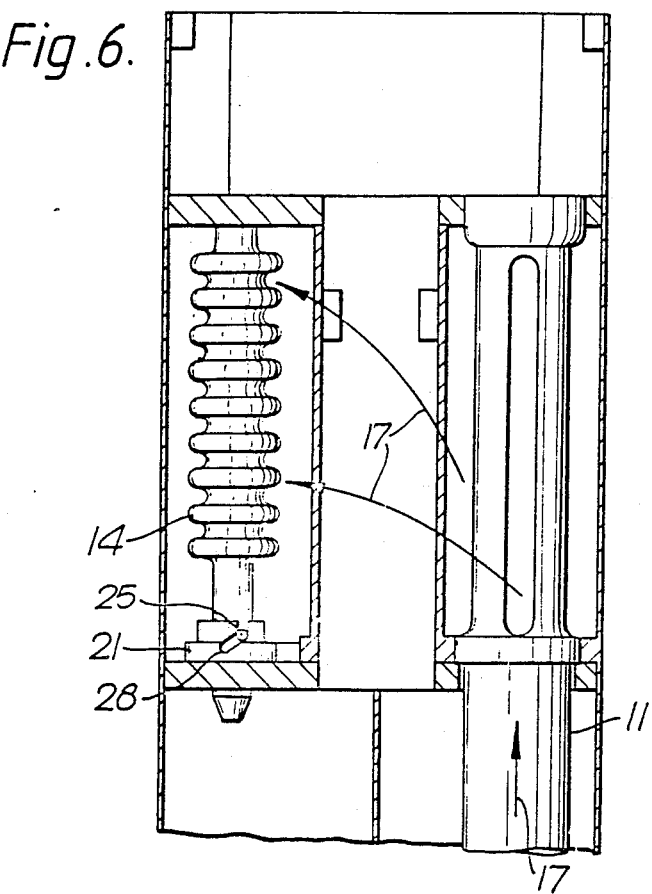
FIG. 6 shows an elevation on the line VI—VI of FIG. 5.

The coolant flow pattern of FIG. 5 is shown in elevation to FIG. 6.

The functioning of the apparatus above described can be considered with FIG. 6 to hand. For normal operation (e.g. below 600° C.) sodium heated by a fuel unit 11 flows over a sodium filled bellows 14 as indicated by arrows 17. The flowing sodium heats the sodium in the bellows and causes the bellows to expand. This causes the cam pin 25 to enter the inclined part of cam slot 28. For normal operation FIG. 6 represents the stable operating condition.

If the coolant flow 17 becomes overheated the bellows expand further. This drives the pin 25 further along the slot 28. This causes plate 21 to move and the projection 22 comes clear of the rim 23, (FIG. 4) and the absorber unit 12 then falls freely into the vehicle 10 and reduces the reactivity of the fuel unit 11 to set a stable safe condition. These events could typically take place when coolant temperature reaches 700° C.

The sodium-filled bellows which is typically 100 mm long, is capable of providing a 2.5 mm deflection for each 100° C. temperature change with a force of 1000 newtons.

The unit described above can be re-cocked on removal from its position in the reactor core either by removal to the edge of the core or by removal from the reactor to a shielded manipulation facility.

The sub-assembly vehicle above described provides a self-contained unit comprising a control rod, fuel heat source, and control rod trigger fully independent of any external activation and substantially free of distortion problems. In general it will find use as a secondary shut-down device and will provide safety back-up in the event of failure or mobility of primary devices to cope with faults such as loss of coolant pumping. The subassembly vehicle is adaptable in that it can be given a large number of locations in a reactor core and it could accordingly be given alternative positions as burn-up of a core causes reactivity to change. The vehicle is also adaptable in that the fuel to absorber ratio in any one unit can be preselected. For example, it is possible to have any whole number ratio, in a six compartment unit, between 1:5 and 5:1.

It is also important to note that the bellows 14 operates unstressed and hence is not subjected to stress recycling risks as the reactor changes temperature.

In FIG. 7 there is shown a bellows 70 having a sodium filling 71. The bellows has a top (fixed) end closure 72 and a bottom (free) end closure 73. The closure 72 is held in one part of a structural frame 74 by a screw 75 and the closure 73 is constrained laterally but free to move axially in a cup 76. The cup is supported on a spring trigger 77 (FIG. 8) and it has a stem 78 movable in a guide aperture 79 in another part of the structural frame 74.

In FIG. 8 the spring trigger 77 is shown having two divergent curved wall parts 80 and a curved base 81 with a hole 82 to accommodate the stem 78 of the cup 76.

The upper edges of the trigger 77 can support control elements 83 by engaging under lips 84 on the rods. This is illustrated in FIG. 7.

In FIG. 9 the cup 76 is shown in perspective view. The cup has flats 85 to accommodate movement of the wall parts 80 of the trigger.

In FIG. 10 another sub-assembly vehicle 90 is shown. The vehicle 90 consists of a hollow body part 91 in which there are located six units 92. These may be either control units (like elements 83) or fuel units 93, or voids, the combination being selectable. In FIG. 10 four of the units are control units and two are fuel units 93. The control units 83 are latched on the trigger 77 and are supported at a higher level than the fuel units and are, in this way, above the reactor core.

In operation, the bellows 10 is situated at a location so as to be responsive to sodium coolant which has flowed upwardly over the fuel units 93 (such flow is indicated by arrows 94). As the coolant temperature rises with the change from zero power in the reactor to operating power so the temperature of the bellows rises and the bellows expands axially. This expansion is unconstrained as the end closure 73 moves freely into the cup 16. Should the temperature of the bellows now rise further (because, for example, there has been an unplanned restraint in the coolant flow) then the closure 73 of the bellows acts on the base of the cup 76 and depresses the cup. At the same time the curved base 81 of the trigger is depressed and this causes the curved wall parts 80 to take up a less divergent orientation until the upper edges of the curved wall parts leave the lips 84 of the control units 83 and the units are free to fall by gravity into the reactor core.

The device described above can be designed to use readily available and relatively inexpensive materials compatible with the hostile environment in which the operation has to be performed and of well-tried performance, namely stainless steel and sodium. The temperature at which the trigger releases can be made adjustable by only relatively simple mechanical operations such as inserting a shallower or deeper cup. The trigger is recockable by the simple operation of raising a released control unit 83 until it relatches on the upper edge of the trigger 77.

The device described above also has the merit that, apart from the trigger 77, it operates unstressed except at the point of operation and even at that point the stress is very low.

We claim:

1. In a liquid metal cooled nuclear reactor, a thermally responsive trigger device for releasing a neutron absorbing element suspended above the reactor core, wherein the improvement comprises,
   a. a closed bellows having a fixed end, and a free end which defines an axially extending push member, the bellows being oriented substantially vertically with the fixed end uppermost and located in the reactor so as to be responsive to the temperature of the reactor coolant;
   b. liquid metal filling the bellows so as to expand the bellows axially and move said push member axially in response to increasing temperatures;
   c. a rotatable plate means below the bellows and having at least one portion thereof for suspending a neutron absorber element therefrom, and
   d. cooperating interengaging cam means carried in part by the push member and in part by the plate means, the cam means being constructed and arranged such that downward movement of the push member as a result of axial expansion of the bellows in response to temperature rise of the coolant causes rotary movement of the plate means thereby to release the neutron absorber element.

2. The combination as claimed in claim 1, including a support means for the plate means, the support means defining an aperture through which the push member extends and inhibiting lateral displacement of the push member.

3. The combination as claimed in claim 1, wherein the liquid metal in the bellows is the same as the liquid metal reactor coolant.

4. The combination as claimed in claim 1, wherein the device is located in a demountable sub-assembly vehicle in the reactor.

* * * * *